United States Patent [19]
Kondo

[11] Patent Number: 5,311,065
[45] Date of Patent: May 10, 1994

[54] ELECTRIC CONTROL CIRCUIT FOR PASSENGER PROTECTION SYSTEM IN AUTOMOTIVE VEHICLES

[75] Inventor: Akira Kondo, Okazaki, Japan
[73] Assignee: Nippondenso Co., Ltd., Kariya, Japan
[21] Appl. No.: 862,127
[22] Filed: Apr. 2, 1992
[30] Foreign Application Priority Data
   Apr. 2, 1991 [JP] Japan ............................ 3-098280
[51] Int. Cl.⁵ .................. B60R 21/32; B60L 1/00; B60L 3/00
[52] U.S. Cl. .................................. 307/10.1; 280/735
[58] Field of Search ............... 307/10.1; 280/728, 734, 280/735; 180/282; 340/436

[56] References Cited
U.S. PATENT DOCUMENTS

| | | | |
|---|---|---|---|
| 5,045,835 | 9/1991 | Masegi et al. | 280/734 |
| 5,122,780 | 6/1992 | Midorikawa et al. | 180/282 |
| 5,135,254 | 8/1992 | Masegi et al. | 280/735 |
| 5,158,323 | 10/1992 | Yamamoto et al. | 307/10.1 |
| 5,187,382 | 2/1993 | Kondo | 307/10.1 |

Primary Examiner—A. D. Pellinen
Assistant Examiner—Peter Ganjoo
Attorney, Agent, or Firm—Cushman, Darby & Cushman

[57] ABSTRACT

An electric control circuit for a passenger protection system in an automotive vehicle includes an electric power source, an acceleration sensor arranged to produce an acceleration signal therefrom in the occurrence of a vehicle collision and an electrically operated actuator including a primer having a first terminal in series with the power source and a second terminal in series with the acceleration sensor to be grounded therethrough in response to the acceleration signal from the sensor, wherein the second terminal of the primer is directly grounded when a voltage appearing at a conductor between the second terminal of the primer and the acceleration sensor becomes lower than a predetermined value to ensure activation of the primer.

12 Claims, 6 Drawing Sheets

ELECTRIC CONTROL CIRCUIT FOR PASSENGER PROTECTION SYSTEM IN AUTOMOTIVE VEHICLES

BACKGROUND OF THE INVENTION

1. Field of the Invention

The present invention relates to a passenger protection system such as an air bag system in automotive vehicles, and more particularly to an electric control circuit for the passenger protection system.

2. Description of the Prior Art

In U.S. Pat. No. 4,222,030 to Yasui et al. issued on Sep. 9, 1980, there is disclosed a passenger protection system having an electrically operated actuator for a gas generator. The passenger protection system includes a primer connected to collision sensors, each sensor is in the form of an acceleration sensor mounted on the front portion of the vehicle. The primer is electrically fired upon acceleration of the vehicle in excess of a predetermined magnitude thereby allowing the gas generator to supply gaseous fluid, under pressure, from the gas generator into an inflatable air bag. In addition to a primary electric power source in the form of the vehicle battery a back-up condenser is provided as a secondary electric power source to ensure a supply of electric energy to the primer. The conductors leading from the collision sensors to the primer, however, are momentarily delayed due to a distance between the collision sensors and the actuator. The practical embodiment further includes a electric energy to the primer, the conductors and collision sensors. This results in a shortage of electric energy for the primer due to a voltage drop caused by internal resistances of the conductors and collision sensors. Such a shortage of electric energy is increased when there is a plurality of primers adapted to the actuator.

SUMMARY OF THE INVENTION

It is, therefore, a primary object of the present invention to provide an improved electric control circuit for a passenger protection system capable a more reliable activation of the primers without causing a shortage of electric energy, as described above.

According to the present invention, the primary object is attained by providing an electric control circuit for a passenger protection system in an automotive vehicle, which includes an electric power source, an acceleration sensor arranged to produce an acceleration signal therefrom in at the occurrence of a vehicle collision and electrically operated actuator means which includes a primer having a first terminal connected in series with the power source and a second terminal connected in series with the acceleration sensor to be grounded therethrough in response to the acceleration signal from the sensor, wherein the electric control circuit comprises first means for detecting a voltage appearing at a conductor between the second terminal of the primer and the acceleration sensor and for producing an electric signal therefrom when the detected voltage becomes lower than a predetermined value, and second means for directly grounding the second terminal of the primer in response to the electric signal from the first means.

In a practical embodiment of the present invention, the first means comprises a reference voltage generator for producing a reference voltage indicative of a predetermined value and a comparator for producing an output signal therefrom when the voltage appearing at the conductor becomes lower than the reference voltage from the reference voltage generator. The practical embodiment further includes a second means comprising a transistor connected at its collector to the second terminal of the primer and grounded at its emitter. The transistor is connected at its base to an output terminal of the comparator and is adapted to be turned on when an output signal from the comparator is applied.

BRIEF DESCRIPTION OF THE DRAWINGS

Additional objects, features and advantages of the present invention will be more readily appreciated from the following detailed description of certain preferred embodiments thereof when taken together with the accompanying drawings, in which.

DESCRIPTION OF THE PREFERRED EMBODIMENTS

Figure 1:
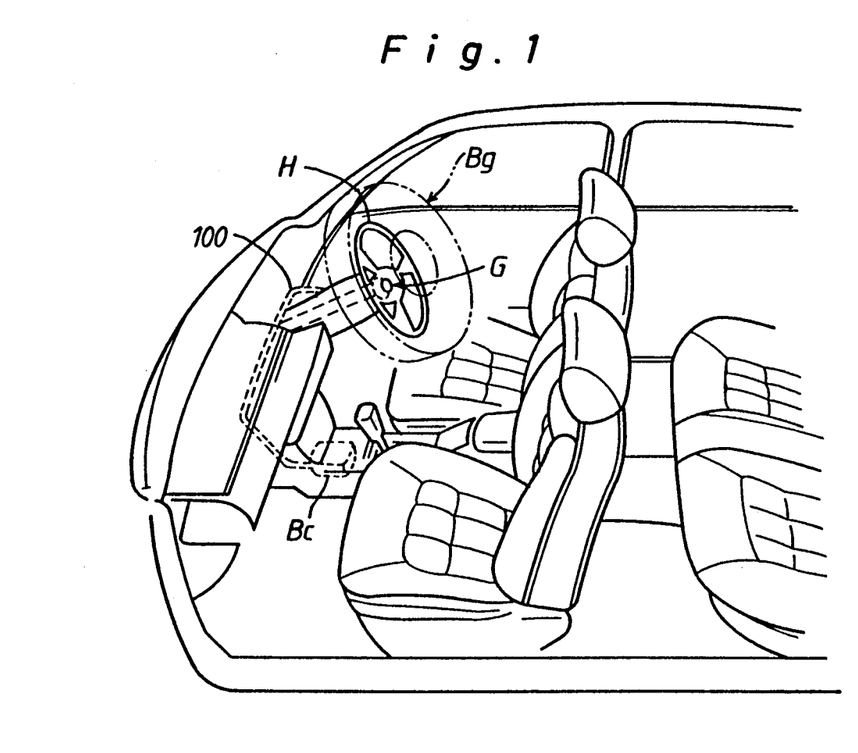
FIG. 1 depicts an air bag system in an automotive vehicle.
Figure 2:
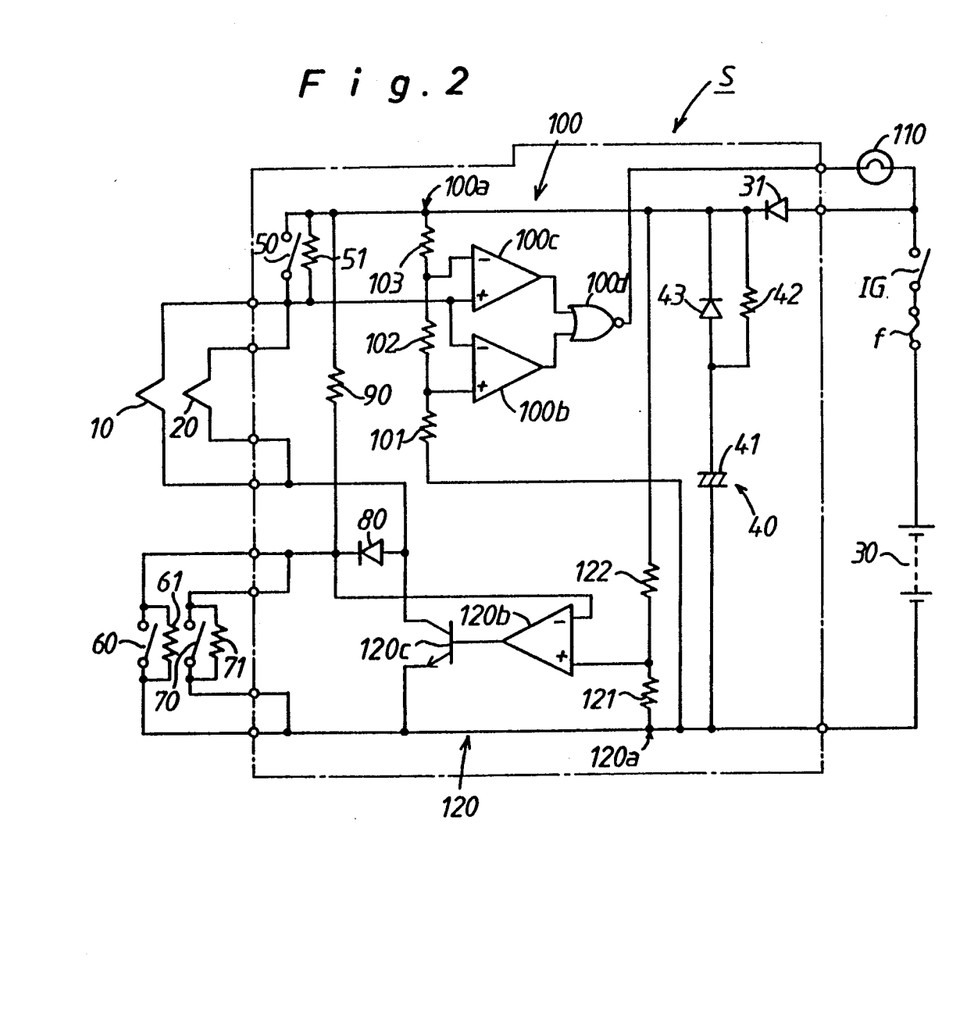
FIG. 2 is a schematic diagram of an electric control circuit for the air bag system.

In FIG. 1 of the drawings, there is illustrated an air bag system for automotive vehicles that includes an inflatable air bag Bg assembled within a steering wheel H of the vehicle, a gas generator G mounted within a central portion of steering wheel H, and an electrically operated actuator S housed within a control box Bc located in the passenger compartment of the vehicle. As shown in FIG. 2, the gas generator G includes two primers 10, 20 connected in parallel with each other to be electrically fired by electric energy applied thereto at the occurrence of a vehicle collision. Thus, the gas generator G is bursted by activation of the primers 10, 20 to supply gaseous fluid, under pressure, into the air bag Bg. In a practical embodiment of the air bag system, either one of the primers 10 or 20 may be provided within a gas generator of an air bag for protection of an assistant passenger.

An electric control circuit for the actuator S is provided with a secondary electric power source 40 in addition to a primary electric power source in the form of a vehicle battery 30. The secondary electric power source 40 is in the form of a back-up condenser 41 which is connected at its positive electrode to the positive electrode of the vehicle battery 30 through a resistor 42, a diode 31, an ignition switch IG of the vehicle. The back-up condenser 41 is a fuse f and grounded at its negative electrode. When the ignition switch IG is closed, the back-up condenser 41 is charged with a DC voltage applied thereto from the vehicle battery 30 through the fuse f, ignition switch IG, diode 31 and resistor 42 and is discharged through a diode 43 connected in parallel with the resistor 42. The diodes 31 and 43 are connected to each other at their cathodes. The anode of diode 31 is connected to the fuse f through the ignition switch IG, while the anode of diode 43 is grounded through the back-up condenser 41.

The electric control circuit for the actuator S includes an acceleration switch 50 in the form of a normally open switch mounted on an appropriate place in the passenger compartment. The acceleration switch 50 is closed upon acceleration of the vehicle in excess of a first predetermined magnitude. The acceleration switch 50 is connected at its one end to the respective cathodes of diodes 31, 43 and at its other end to a first common terminal of primers 10 and 20. The electric control circuit further includes acceleration switches 60 and 70 each in the form of a normally open switch mounted on a front end portion of the vehicle body. Acceleration switches 60 and 70 are closed upon acceleration of the vehicle in excess of a second predetermined magnitude at the occurrence of a vehicle collision. The acceleration switches 60 and 70 are connected in parallel with each other and grounded at a common terminal thereof. Another common terminal of acceleration switches 60 and 70 is connected to a second common terminal of primers 10 and 20 through a diode 80.

In this embodiment, the diode 80 is connected at its cathode to the common terminal of acceleration switches 60 and 70 and at its anode to the second common terminal of primers 10 and 20. As described above, the actuator S is located in the passenger compartment and the acceleration switches 60 and 70 are located on the front end portion of the vehicle. Accordingly, the conduction between the cathode of diode 80 and the common terminal of acceleration switches 60 and 70 is momentarily delayed due to a distance of at least 2-3 meters. Monitor resistors 51, 61 and 71 are respectively connected in parallel with the acceleration switches 50, 60 and 70 to restrain electric current supplied to the primers 10 and 20 from the battery 30 or back-up condenser 40 in a condition where the acceleration switches 50, 60 and 70 are maintained in their open positions. The internal resistance value of the respective monitor resistors 51, 61 and 71 is determined to be larger than the internal resistance value of the respective primers 10 and 20. A monitor resistor 90 is connected at its one end to the respective cathodes of diodes 31 and 43 and at its other end to the cathode of diode 80. The monitor resistor 90 co-operates with the monitor resistors 61 and 71 in such a manner that each condition of the acceleration switches 60 and 70 can be detected even when a driving transistor 120c is turned on, as described later.

A malfunction detecting circuit 100 includes a reference voltage generator 100a in the form of resistors 101, 102 and 103, which are connected in series with each other and divide the DC voltage applied thereto from the battery 30 or back-up condenser 40 in order to generate a first reference voltage at a common terminal of the resistors 101 and 102 and a second reference voltage at a common terminal of the resistors 102 and 103. In this embodiment, the first reference voltage corresponds with a reference value necessary for detecting a malfunction caused by a ground or a short in the primers 10 and 20. The second reference voltage correspond with a reference value necessary for detecting a malfunction caused by a disconnection of the primers 10 and 20.

In the malfunction detecting circuit, a comparator 100b is arranged to compare the terminal voltage appearing at the first common terminal of primers 10 and 20 with the first reference voltage comparator 100b generates a low level signal therefrom when the terminal voltage is maintained higher than the first reference voltage under a normal condition of primers 10 and 20. Comparator 100b generates a high level signal therefrom when the terminal voltage becomes lower than the first reference voltage due to as ground or a short of both the primers 10 and 20. A comparator 100c is arranged to compare the terminal voltage appearing at the first common terminal of primers 10 and 20 with the second reference voltage. Comparator 100c generates a low level signal therefrom when the terminal voltage is maintained lower than the second reference voltage under a normal condition of primers 10 and 20. Comparator 100c also generates a high level signal therefrom when the terminal voltage becomes higher than the second reference voltage due to disconnection of both primers 10 and 20.

A NOR gate 100d has a pair of input terminals respectively connected to the output terminals of comparators 100b and 100c. The NOR gate 100d generates a high level signal therefrom when it receives a low level signal from both the comparators 100b and 100c NOR gate 100d generates a low level signal therefrom when it receives a high level signal from comparator 100b or 100c. An indication lamp 110 is connected at its one end to the positive electrode of battery 30 through the ignition switch IG and at its other end to the output terminal of NOR gate 100d. When supplied with the DC voltage from battery 30 in response to the low level signal from NOR gate 100d, the indication lamp 110 is lit to inform the operator of malfunction of the primers 10 and 20.

A driving circuit 120 includes a reference voltage generator 120a, a comparator 120b and a driving transistor 120c. The reference voltage generator 120a has a resistor 121 grounded at its one end and connected at its other end to the cathodes of diodes 31, 43 through a resistor 122. When a DC voltage is applied from battery 30 through the ignition switch IG and diode 31 or from the secondary electric power source 40, the reference voltage generator 120a generates a reference voltage at a common terminal of resistors 121 and 122. In this embodiment, the reference voltage is determined to be higher than the voltage appearing at the cathode of diode 80 when either of the acceleration switches 60 or 70 have been closed. The comparator 120b has a positive input terminal connected to the common terminal of resistors 121, 122 and a negative input terminal connected to the cathode of diode 80. When the diode 80 is supplied with the monitor current through the primers 10 and 20, the comparator 120b compares the cathode voltage appearing at the cathode of diode 80 with the reference voltage applied from the reference voltage generator 120a.

When the cathode voltage of diode 80 is maintai ed higher than the reference voltage when acceleration switches 60 and 70 are in their open positions, the comparator 120b generates a low level signal therefrom. When the cathode voltage of diode 80 becomes lower than the reference voltage, due either one of the acceleration switches 60 and 70 closing the comparator 120b generates a high level signal therefrom. The driving transistor 120c is connected at its base to the output terminal of comparator 120b, its emitter is grounded and its collector is connected to the anode of diode 80. Thus, the transistor 120c is turned on in response to a high level signal from comparator 120b and turned off in response to a low level signal from comparator 120b.

Assuming that the ignition switch IG has been closed in operation, the back-up condenser 41 is charged with the DC voltage applied from battery 30 through the diode 31 and resistor 42. When the primers 10 and 20 each are maintained in a normal condition, the DC voltage from battery 30 is applied to the primers 10, 20 and diode 80 through diode 31 under the control of the monitor resistors 51 and 61 and 71, the comparators 100b, 100c when applied with the first and second reference voltages from the reference voltage generator 100a, and the comparator 120b when applied with the reference voltage from the reference voltage generator 120a. In such a condition, the voltage appearing at the first common terminal of primers 10 and 20 is maintained higher than the first reference voltage and lower than the second reference voltage. Thus, the comparators 100b and 100c generate low level signals therefrom, and the NOR gate 100d generates a high level signal therefrom to maintain the indication lamp 110 in its deenergized condition. Since the acceleration switches 60, 70 are maintained in their open positions, the cathode voltage of diode 80 is maintained higher than the reference voltage applied from the reference voltage generator 120a so that the driving transistor 120c is also maintained in its deenergized condition.

If either one of the primers 10 and 20 is grounded or shorted, the voltage at the first common terminal of primers 10 and 20 becomes lower than the first reference voltage applied from the reference voltage generator 100a. As a result, the comparator 100b generates a high level signal therefrom, and the NOR gate 100d generates a low level signal therefrom. In response to the low level signal from NOR gate 100d, the indication lamp 110 is lit to inform the operator of malfunction of primer 10 or 20. If the primers 10 and 20 are disconnected, the voltage at the first common terminal of primers 10 and 20 becomes higher than the second reference voltage applied from the reference voltage generator 100a. As a result, the comparator 100c generates a high level signal therefrom, and the indication lamp 110 is lit in response to a low level signal from NOR gate 100d informing the operator of a malfunction of primers 10 and 20.

Assuming that the vehicle has been started under the normal conditions of primers 10 and 20 and driving transistor 120c, the acceleration switch 50 is closed upon acceleration of the vehicle in excess of the first predetermined magnitude. When at least one of the acceleration switches 60 or 70 is closed upon acceleration of the vehicle in excess of the second predetermined magnitude in the occurrence of a vehicle collision, the cathode voltage of diode 80 becomes lower than the reference voltage applied from the reference voltage generator 120a. As a result, the comparator 120b generates a high level signal therefrom, and the driving transistor 120c is turned on in response to the high level signal from comparator 120b to ground the second common terminal of primers 10 and 20 therethrough. Thus, the diode 80 is biased in a reverse direction and prohibits electric energy from being applied to the acceleration switches 60 and 70. If the conductor leading from the battery 30 is disconnected in the occurrence of the vehicle collision, the back-up condenser 41 is discharged to apply the DC voltage therefrom to the primers 10 and 20, and the driving transistor 120c is turned on to ground the second common terminal of primers 10 and 20 therethrough. Thus, the primers 10 and 20 are effectively fired by the DC voltage applied from back-up condenser 41 to burst the gas generator G, and the air bag Ba is expanded by the gaseous fluid under pressure supplied from gas generator G as shown by imaginary lines in FIG. 1.

If the driving transistor 120c can not be turned on due to damage in the occurrence of the vehicle collision, the anode voltage of diode 80 is maintained at the same level as the voltage at the second common terminal of primers 10, 20. Thus, the diode 80 is biased in a forward direction permitting electric current supplied therethrough to the acceleration switches 60 and 70. In this instance, the primers 10 and 20 are fired by the DC voltage applied from battery 30 unless the conductor leading from the battery 30 is disconnected.

Assuming that the cathode voltage of diode 80 has been decreased due to noises acting on the conductor between the diode 80 and acceleration switches 60, 70 in a condition where the acceleration switches 60, 70 are maintained in their open positions, the driving transistor 120c is temporarily turned on under control of the comparator 120b to ground the second common terminal of primers 10 and 20. In this instance, the diode 80 acts to increase the voltage at its cathode immediately after disappearance of the noises. Thus, the transistor 120c is turned off under control of the comparator 120b. This is effective for avoiding an error in activating the primers 10 and 20.

Figure 3:
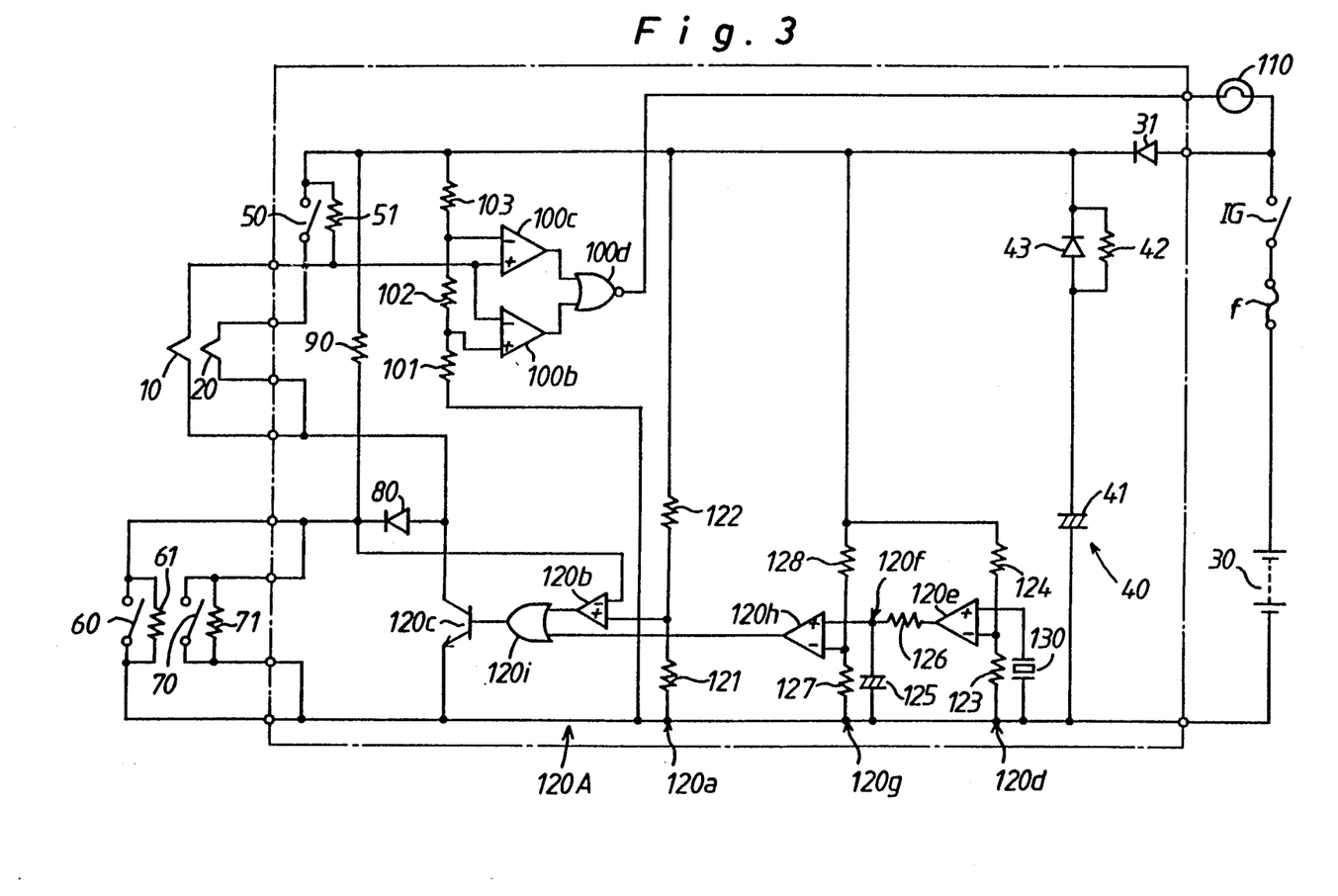
FIG. 3 is a schematic diagram of a first modification of the electric control circuit shown in FIG. 2.

In FIG. 3 there is illustrated a first modification of the electric control circuit in which a driving circuit 120A is substituted for the driving circuit 120 and an acceleration sensor 130 is additionally provided. The acceleration sensor 130 is in the form of a piezo-electric or semiconductor element which is located at an appropriate place in the passenger compartment to produce an acceleration signal indicative of an actual acceleration of the vehicle. The driving circuit 120A includes a reference voltage generator 120d composed of resistors 123 and 124 which are connected in series with each other. The resistor 123 is grounded at its one end and connected at its other end to the cathodes of diodes 31 and 43 through the resistor 124. The reference voltage generator 120d divides the DC voltage applied from the battery 30 or discharged from the back-up condenser 41 to generate a reference voltage at a common terminal of resistors 123 and 124. In this modification, the reference voltage is lower than the voltage representing the acceleration of the vehicle at the occurrence of a collision.

A comparator 120e compares the level of the acceleration signal from acceleration sensor 130 with the reference voltage from the reference voltage generator 120d and produces a low level signal therefrom when the acceleration signal level is lower than the reference voltage. The comparator 120e produces a high level signal therefrom when the acceleration signal level is higher than the reference voltage. A time constant circuit 120f includes a condenser 125 grounded at its one end and connected at its other end to the output terminal of comparator 120e through resistor 126. When applied with a high level signal from the comparator 120e, the time constant circuit 120f produces a time constant voltage at a predetermined level after a time laps defined by a time constant of condenser 125 and resistor 126. In this modification, the level of the time constant voltage is determined to be a value necessary for preventing an error in detection of the acceleration sensor 130. A reference voltage generator 120g is composed of resistors 127 and 128 which are connected in series with each other. Resistor 127 is grounded at its one end and connected at its other end to cathodes of diodes 31 and 43 through the resistor 128. The reference voltage generator 120g is arranged to divide the DC voltage applied from the battery 30 or discharged from the back-up condenser 41 for generating a reference voltage at a common terminal of resistors 127 and 128. The reference voltage is determined to be lower than the level of the time constant voltage.

A comparator 120h is provided to compare the time constant voltage from the time constant circuit 120f with the reference voltage from the reference voltage generator 120g and produce a low level signal therefrom when the time constant voltage is lower than the reference voltage. Comparator 120h produces a high level signal when the time constant voltage is higher than the reference voltage. As previously described, the resistor 121 of the reference voltage generator 120a is grounded at its one end and connected at its other end to the cathodes of diodes 31 and 43 through the resistor 122. When at least one of the acceleration switches 60 or 70 is closed at the time of a vehicle collision, comparator 120b produces a high level signal therefrom in such a manner as previously described. An OR gate 120i has a first input terminal connected to the output terminal of comparator 120b and a second input terminal connected to the output terminal of comparator 120h. The output terminal of OR gate 120i is connected to the base of transistor 120c. When a high level signal is applied from the comparator 120h or 120b, the driving transistor 120c is turned on to ground the second common terminal of primers 10 and 20, and diode 80 is biased in a reverse direction.

Assuming that at least one of the acceleration switches 60 and 70 has been closed at the occurrence of a vehicle collision under normal conditions of the primers 10, 20 and driving transistor 120c, the cathode voltage of diode 80 drops to ground level. As a result, the comparator 120b produces a high level signal therefrom, and in turn, the OR gate 120i produces a high level signal therefrom. In this instance, the acceleration sensor 130 produces an acceleration signal that becomes higher than the reference voltage applied from the reference voltage generator 120d. Thus, the comparator 120e produces a high level signal. When applied with the high level signal from comparator 120e, the time constant circuit 120f generates a time constant voltage after a lapse of the time defined by the time constant of condenser 125 and resistor 126. When applied with the time constant voltage at a higher level than the reference voltage applied from the reference voltage generator 120g, the comparator 120h causes the OR gate 120i to produce a high level signal therefrom. In response to the high level signal from OR gate 120i, the driving transistor 120c is turned on to short the diode 80, acceleration switches 60, 70 and the conductors between the cathode of diode 80 and acceleration switches 60, 70. Thus, primers 10 and 20 are effectively fired by the DC voltage applied from the battery 30 or discharged from the back-up condenser 41. In this modification, the acceleration sensor 130 is useful to reliably fire the primers 10 and 20 at the occurrence of a vehicle collision.

In practical embodiments of the present invention, the acceleration switches 60 and 70 may be replaced with an acceleration sensor in the form of a piezo-electric or semiconductor element, respectively. In such a case, a determination circuit is adapted to determine the acceleration level detected by the acceleration sensor and applying the result to the comparator 120b or OR gate 120i. Diode 80 and transistor 120c may be replaced with various kinds of semiconductor switching elements, and the number of primers 10, 20 may be increased or decreased.

Figure 4:
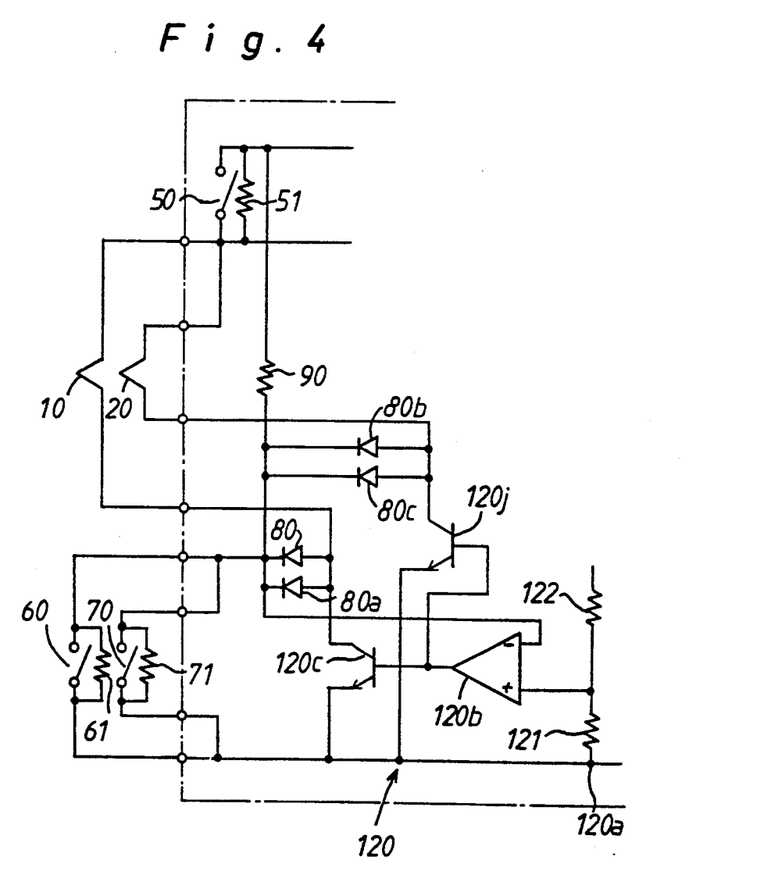
FIG. 4 is a schematic diagram of a second modification of the electric control circuit shown in FIG. 2.

In FIG. 4 there is illustrated a second modification of the electric control circuit wherein the driving transistor 120c is connected at its collector only to the primer 10 while a driving transistor 120j is connected at its collector only to the primer 20. In this modification, the driving transistor 120j is connected at its base to the output terminal of comparator 120b and grounded at its emitter. An additional diode 80a is connected in parallel with the diode 80, and a pair of additional diodes 80b and 80c are connected in parallel with each other. The diodes 80b and 80c are connected at their cathodes to the negative input terminal of comparator 120b and at their anodes to the collector of driving transistor 120j. Assuming that at least either one of the acceleration switches 60 and 70 has been closed at the occurrence of a vehicle collision, the driving transistor 120c is turned on, even if either one of the diodes 80 or 80a is damaged, and the driving transistor 120j is also turned on even if either one of the diodes 80b or 80c is damaged. This is useful to more reliably fire the primers 10 and 20 at a occurrence of the vehicle collision.

Figure 5:
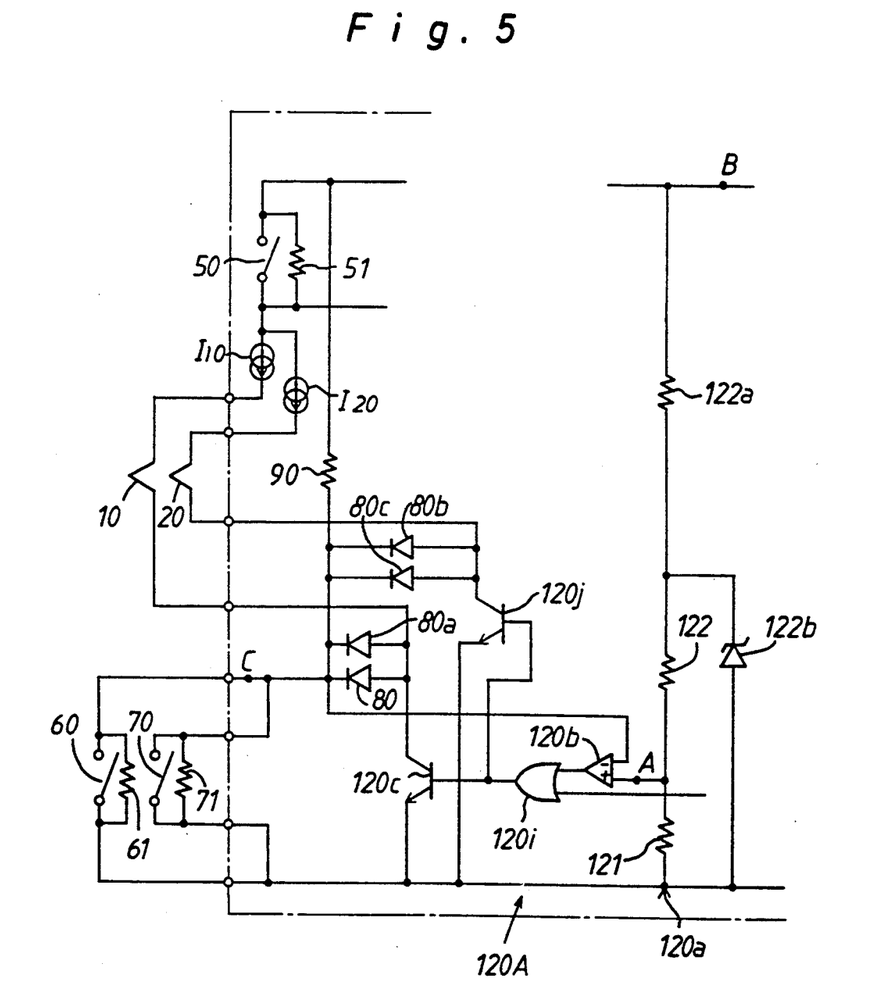
FIG. 5 is a schematic diagram of a variation of the second modification shown in FIG. 4.

In FIG. 5 there is illustrated a variation of the second modification wherein constant-current circuits $I_{10}$ and $I_{20}$ are interposed between the monitor resistor 51 and primer 10 and between the monitor resistor 51 and primer 20 respectively, and wherein a resistor 122a is connected in series with the resistor 122 and a Zener diode 122b is connected in parallel with the resistors 121 and 122. In this variation, the constant-current circuits $I_{10}$ and $I_{20}$ are arranged to permit the battery current to pass therethrough without any restriction when the voltage at a point B is maintained at a lower level than a predetermined value. Constant-current circuit $I_{10}$ and $I_{20}$ also restrict the battery current to a constant current when the voltage at the point B becomes higher than the predetermined value.

Figure 6:
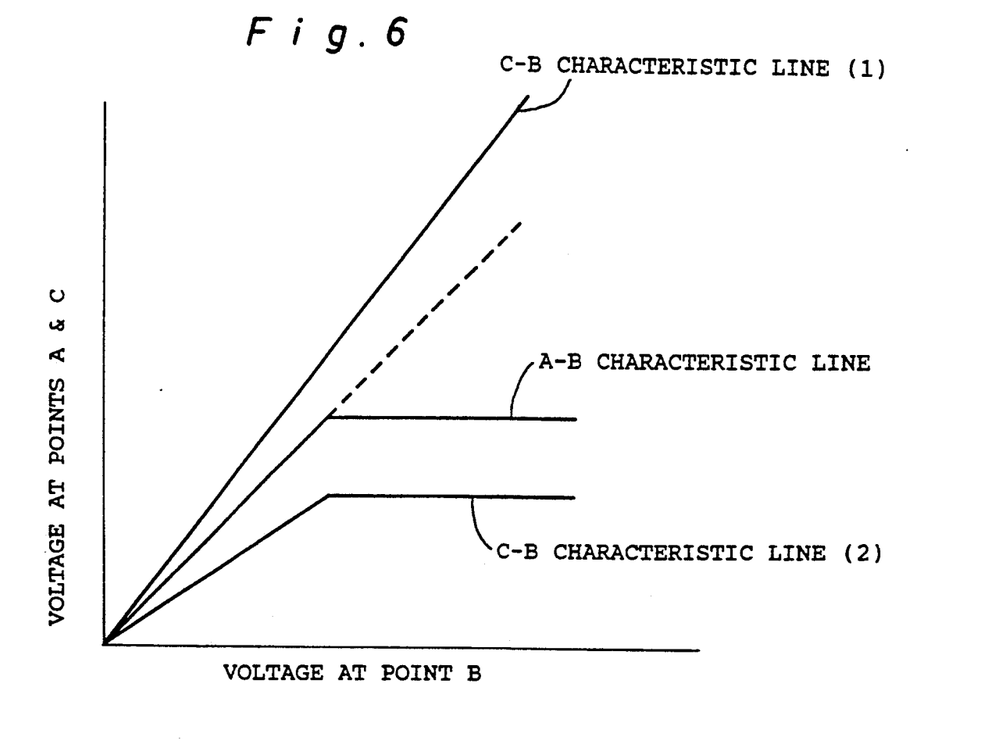
FIG. 6 is a graph showing a relationship between voltages at points B and A in the electric control circuit shown in FIG. 5.

Assuming that the acceleration switches 50, 60, 70 are maintained in their open positions, the voltage at a point C is linearly increased in accordance with a voltage increase at point B as shown by the C-B characteristic line (1) in FIG. 6. When the acceleration switches 50, 60, 70 are closed due to the voltage at the point B being maintained at a lower level than the predetermined value, then the voltage at the point C is linearly increased in accordance with the increase of voltage at the point B. When the voltage at the point B exceeds the predetermined value, the voltage at point C is maintained at a constant value under the control of the constant-current circuits $I_{10}$ and $I_{20}$ as shown by a C-B characteristic line (2) in FIG. 6. In this variation, the threshold value of comparator 120b is adjusted by the Zener diode 122b in such a manner that the voltage at a point is controlled in accordance with a voltage increase at point B as shown by the A-B characteristic line in FIG. 6. With the arrangement of constant-current circuits $I_{10}$, $I_{20}$ and Zener diode 122b, the driving transistors 120c and 120j are maintained in their off-positions even if the voltage at the point C is decreased due to noises acting on the conductor between the diode 80 and acceleration switches 60 and 70. This is effective to avoid an error in the activation of primers 10 and 20. When acceleration switches 60, 70 are closed at the occurrence of a vehicle collision, the voltage at point C is controlled by the constant-current circuits $I_{10}$ and $I_{20}$, as shown by the C-B characteristic line (2) in FIG. 6, while the voltage at point A is controlled by the Zener diode 122b, as shown by the A-B characteristic line in FIG. 6. Thus, the driving transistor 120c is turned on to fire the primers 10 and 20 without any influence caused by electrical noises.

What is claimed is:

1. An electric control circuit for a passenger protection system in an automotive vehicle, comprising:
    an electric power source;
    a primary acceleration sensor arranged to produce a first acceleration signal at an occurrence of a first acceleration;
    a primer having a first terminal in series with said power source and a second terminal grounded through said primary acceleration sensor; and
    means for electrically actuating the primer in response to the first acceleration signal from the primary acceleration sensor, comprising:
        first means for detecting the first acceleration signal at a conductor between the primary acceleration sensor and the second terminal of the primer and for producing a first electric signal when the detected voltage becomes lower than a first predetermined value; and
        second means for grounding the second terminal of the primer in response to the first electric signal from the first means.

2. An electric control circuit for a passenger protection system as claimed in claim 1; wherein the first means comprises a first reference voltage generator for producing a first reference voltage at the first predetermined value and a comparator for producing the first electric signal when the voltage appearing at the conductor becomes lower than the first reference voltage from the first reference voltage generator; and wherein the second means comprises a transistor having a collector connected to the second terminal of the primer, an emitter grounded and a base connected to an output terminal of the comparator, the transistor being turned on by the first electric signal from the comparator.

3. An electric control circuit for a passenger protection system as claimed in claim 2, wherein a diode is disposed within the conductor between the second terminal of the primer and the primary acceleration sensor, the diode being electrically connected at its cathode between the power source and the comparator, the diode being connected at its anode to the second terminal of the primer and the collector of the transistor.

4. An electric control circuit for a passenger protection system as claimed in claim 3, wherein an additional diode is connected in parallel with the diode such that the cathode of the additional diode is connected to the cathode of the diode and the anode of the additional diode is connected to the anode of the diode.

5. An electric control circuit for a passenger protection system as claimed in claim 2, further comprising a constant-current circuit interposed between the power source and the first terminal of the primer, the constant current circuit adapted to permit an electric current to pass therethrough from the power source without restriction when the voltage of the power source is lower than a second predetermined value and the electric current from the power source to a constant current when the voltage of the power source becomes higher than the second predetermined value.

6. An electric control circuit for a passenger protection system as claimed in claim 2, further comprising a zener diode connected in parallel with the first reference voltage generator to linearly increase the first reference voltage in accordance with an increase of the power source voltage when the power source voltage is lower than a second predetermined value and to maintain the reference voltage at a constant value when the power source voltage is higher than the second predetermined value, the anode of the zener diode being connected to ground.

7. An electric control circuit for a passenger protection system as claimed in claim 1, further comprising a secondary acceleration sensor disposed between the power source and the first terminal of the primer and electrically connecting the power source to the first terminal of the primer at an occurrence of a second acceleration, the second acceleration being lower than the first acceleration.

8. An electric control circuit for a passenger protection system as claimed in claim 1, wherein the primary acceleration sensor is a normally open mechanical switch which closes at the occurrence of an acceleration in excess of a predetermined magnitude in the occurance of a vehicle collision.

9. An electric control circuit for a passenger protection system as claimed in claim 1, wherein said electric power source comprises a vehicle battery and a secondary electric power source in parallel with the vehicle battery.

10. An electric control circuit for a passenger protection system as claimed in claim 9, wherein said secondary electric power source comprises a back-up condenser.

11. An electric control circuit for a passenger protection system as claimed in claim 1, further comprising:
    a third acceleration sensor arranged to produce a second acceleration signal indicating an acceleration of the vehicle; and
    a third means for detecting the second acceleration signal and for producing a third electric signal indicative of an acceleration condition, the second means being arranged to ground the second terminal of the primer in response to either the first electric signal or the third electric signal.

12. An electric control circuit for a passenger protection system as claimed in claim 11, wherein the first means comprises a first reference voltage generator for producing a first reference voltage at the first predetermined value and a first comparator for producing the first electric signal when the voltage appearing at the conductor becomes lower than the first reference voltage;
    wherein the third means comprises:
        a second reference voltage generator for producing a second reference voltage which is lower than the second acceleration signal when the acceleration condition is that of a vehicle collision;
        a second comparator for producing a second electric signal when the level of the second acceleration signal is higher than the second reference voltage;
        means for producing a time constant voltage having a maximum predetermined level after a predetermined amount of time elapses;
        a third reference voltage generator for producing a third reference voltage which is lower than the maximum predetermined level of the time constant voltage; and a third comparator means for producing a third electric signal when the time constant voltage becomes higher than the third reference voltage; and wherein the second means comprises an OR gate arranged to produce a fourth electric signal in response to either the first electric signal or the third electric signal and a transistor having a collector connected to the second terminal of the primer, an emitter grounded, and a base connected to an output terminal of the OR gate, the transistor being turned on by the fourth electric signal whereby the second terminal of the primer is pulled to the ground.

* * * * *